(12) United States Patent
Wuidart

(10) Patent No.: US 9,407,307 B2
(45) Date of Patent: Aug. 2, 2016

(54) TRANSPONDER POSITIONING AID

(75) Inventor: Luc Wuidart, Pourrières (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 202 days.

(21) Appl. No.: 14/123,745

(22) PCT Filed: Apr. 18, 2012

(86) PCT No.: PCT/FR2012/050843
§ 371 (c)(1),
(2), (4) Date: Dec. 3, 2013

(87) PCT Pub. No.: WO2012/164179
PCT Pub. Date: Dec. 6, 2012

(65) Prior Publication Data
US 2014/0113692 A1  Apr. 24, 2014

(30) Foreign Application Priority Data
Jun. 3, 2011 (FR) ...................... 11 54862

(51) Int. Cl.
H04Q 5/22 (2006.01)
H04B 1/3816 (2015.01)
G06K 19/07 (2006.01)

(52) U.S. Cl.
CPC .......... *H04B 1/3816* (2013.01); *G06K 19/0701* (2013.01); *G06K 19/0723* (2013.01)

(58) Field of Classification Search
CPC ............ G06K 7/0008; G06K 19/0701; G06K 19/0723; G08C 19/28
USPC ......................................................... 340/10.1
See application file for complete search history.

(56) References Cited

U.S. PATENT DOCUMENTS

| 5,703,573 A | 12/1997 | Fujimoto et al. |
| 6,356,198 B1 | 3/2002 | Wuidart et al. |
| 6,462,647 B1 | 10/2002 | Roz |
| 6,473,028 B1 | 10/2002 | Luc |
| 6,547,149 B1 | 4/2003 | Wuidart et al. |

(Continued)

FOREIGN PATENT DOCUMENTS

| EP | 0 722 094 A1 | 7/1996 |
| EP | 0857981 | 8/1998 |

(Continued)

OTHER PUBLICATIONS

English Translation of Written Opinion of International Searching Authority Dated Dec. 4, 2013 for corresponding International Application No. PCT/FR2012/050842, 5 pages.

(Continued)

*Primary Examiner* — Vernal Brown
(74) *Attorney, Agent, or Firm* — Seed IP Law Group PLLC

(57) ABSTRACT

A method for assisting with positioning of an electromagnetic transponder by a user with respect to a terminal, wherein: a current value of a ratio of the current coupling factor between the transponder and the terminal to an optimum coupling factor with a first resistive load value is calculated and stored; the current value is compared with a previous value of this ratio, stored in a previous iteration; and data elements intended for the user are controlled according to the comparison.

19 Claims, 5 Drawing Sheets

(56) References Cited

U.S. PATENT DOCUMENTS

| | | | |
|---|---|---|---|
| 6,650,226 B1 | 11/2003 | Wuidart et al. | |
| 6,650,229 B1 | 11/2003 | Wuidart et al. | |
| 6,703,921 B1 | 3/2004 | Wuidart et al. | |
| 6,784,785 B1 | 8/2004 | Wuidart et al. | |
| 6,879,246 B2 | 4/2005 | Wuidart | |
| 6,944,424 B2 | 9/2005 | Heinrich et al. | |
| 6,950,008 B2 | 9/2005 | Hagl et al. | |
| 6,960,985 B2 | 11/2005 | Wuidart | |
| 7,005,967 B2 | 2/2006 | Wuidart | |
| 7,046,121 B2 | 5/2006 | Wuidart | |
| 7,049,935 B1 | 5/2006 | Wuidart et al. | |
| 7,049,936 B2 | 5/2006 | Wuidart | |
| 7,058,357 B1 | 6/2006 | Wuidart et al. | |
| 7,107,008 B2 | 9/2006 | Wuidart | |
| 7,263,330 B2 | 8/2007 | Wuidart | |
| 7,606,532 B2 | 10/2009 | Wuidart | |
| 7,995,965 B2 | 8/2011 | Wuidart | |
| 8,130,159 B2 | 3/2012 | Wuidart et al. | |
| 8,395,485 B2 | 3/2013 | Wuidart | |
| 8,446,259 B2 | 5/2013 | Wuidart | |
| 8,482,388 B2 | 7/2013 | Wuidart | |
| 8,564,413 B2 | 10/2013 | Wuidart | |
| 8,676,163 B2 | 3/2014 | Wuidart | |
| 8,718,552 B2 | 5/2014 | Wuidart | |
| 8,798,533 B2 | 8/2014 | Wuidart | |
| 8,907,761 B2 | 12/2014 | Wuidart | |
| 8,922,338 B2 | 12/2014 | Wuidart | |
| 8,922,341 B2 | 12/2014 | Wuidart | |
| 8,988,196 B2 | 3/2015 | Wuidart | |
| 9,098,788 B2 | 8/2015 | Wuidart | |
| 2003/0071717 A1 | 4/2003 | Hagl et al. | |
| 2003/0121985 A1* | 7/2003 | Baldischweiler | G06K 19/0707 235/492 |
| 2003/0169169 A1 | 9/2003 | Wuidart et al. | |
| 2004/0104809 A1 | 6/2004 | Rizzo et al. | |
| 2005/0001609 A1 | 1/2005 | Cuylen | |
| 2005/0141256 A1 | 6/2005 | Yamazaki et al. | |
| 2005/0231328 A1 | 10/2005 | Castle et al. | |
| 2006/0172702 A1 | 8/2006 | Wuidart et al. | |
| 2007/0164122 A1 | 7/2007 | Ju | |
| 2008/0079542 A1 | 4/2008 | Rofougaran | |
| 2008/0129509 A1* | 6/2008 | Duron | H01Q 1/2216 340/572.4 |
| 2008/0136643 A1 | 6/2008 | Yeo et al. | |
| 2008/0204206 A1 | 8/2008 | Frohler | |
| 2009/0065575 A1 | 3/2009 | Phillips et al. | |
| 2009/0273452 A1 | 11/2009 | Wuidart | |
| 2010/0068999 A1 | 3/2010 | Bangs et al. | |
| 2010/0283698 A1* | 11/2010 | Orihara | G06K 19/07749 343/788 |
| 2010/0291871 A1 | 11/2010 | Butler | |
| 2010/0323629 A1 | 12/2010 | Wuidart | |
| 2010/0328045 A1* | 12/2010 | Goto | G06K 7/0008 340/10.4 |
| 2011/0095769 A1 | 4/2011 | Wuidart | |
| 2011/0140852 A1 | 6/2011 | Wuidart | |
| 2011/0193688 A1* | 8/2011 | Forsell | A61N 1/3787 340/10.4 |
| 2011/0319016 A1 | 12/2011 | Gormley et al. | |
| 2012/0092901 A1 | 4/2012 | Wuidart | |
| 2012/0105012 A1 | 5/2012 | Wuidart | |
| 2014/0113554 A1 | 4/2014 | Wuidart | |
| 2014/0113692 A1 | 4/2014 | Wuidart | |
| 2014/0118115 A1 | 5/2014 | Wuidart | |

FOREIGN PATENT DOCUMENTS

| | | |
|---|---|---|
| EP | 1 043 677 A1 | 10/2000 |
| EP | 1 071 038 A1 | 1/2001 |
| EP | 1 304 661 A1 | 4/2003 |
| EP | 2077518 A1 | 7/2009 |
| EP | 2114019 A1 | 11/2009 |
| FR | 2 757 952 A1 | 7/1998 |
| GB | 2 321 725 A | 8/1998 |
| GB | 2464362 A | 4/2010 |
| WO | 2009/105115 A2 | 8/2009 |

OTHER PUBLICATIONS

English Translation of Written Opinion of International Searching Authority dated Dec. 4, 2013 for corresponding International Application No. PCT/FR2012/050844, 6 pages.

English Translation of Written Opinion of International Searching Authority dated Dec. 4, 2013 for corresponding International Application No. PCT/FR2012/050845, 6 pages.

International Search Report dated Jun. 26, 2012 from corresponding International Application No. PCT/FR2012/050843.

International Search Report dated Sep. 10, 2012 from potentially related International Application No. PCT/FR2012/050842.

International Search Report dated Sep. 7, 2012 from potentially related International Application No. PCT/FR2012/050844.

International Search Report dated Sep. 7, 2012 from potentially related International Application No. PCT/FR2012/050845.

English Translation of the Written Opinion of the International Searching Authority dated Dec. 4, 2013 from corresponding International Application No. PCT/FR2012/050843.

French Search Report dated Feb. 9, 2010, for corresponding FR Application No. 0954147, 2 pages.

French Search Report dated Feb. 9, 2010, for corresponding FR Application No. 0954148, 2 pages.

French Search Report dated Feb. 8, 2010, for corresponding FR Application No. 0954149, 2 pages.

French Search Report dated Feb. 2, 2010, for corresponding FR Application No. 0954345, 2 pages.

French Search Report dated Feb. 3, 2010, for corresponding FR Application No. 0954347, 2 pages.

French Search Report dated Feb. 17, 2010, for corresponding FR Application No. 0954351, 2 pages.

Translation of International Search Report and Written Opinion dated Jun. 3, 2010, for corresponding International Application No. PCT/FR2010/051090, 4 pages.

Translation of International Search Report and Written Opinion dated Jun. 3, 2010, for corresponding International Application No. PCT/FR2010/051091, 4 pages.

U.S. Appl. No. 14/123,739, filed Dec. 16, 2013, Luc Wuidart.
U.S. Appl. No. 14/123,751, filed Dec. 16, 2013, Luc Wuidart.
U.S. Appl. No. 14/123,755, filed Dec. 16, 2013, Luc Wuidart.

* cited by examiner

TRANSPONDER POSITIONING AID

CROSS REFERENCE TO RELATED APPLICATIONS

This application is the U.S. National Stage of international patent application number PCT/FR2012/050843, filed on Apr. 18, 2012, which claims the priority benefit of French patent application number 11/54862, filed on Jun. 3, 2011, which applications are hereby incorporated by reference to the maximum extent allowable by law.

BACKGROUND

1. Technical Field

Embodiments generally relate to systems using transponders, that is, transceivers (generally mobile) capable of communicating in a contactless and wireless manner with a terminal.

2. Discussion of the Related Art

Electromagnetic transponder systems are more and more used with the coming up of mobile telecommunication devices equipped with near field communication routers (NFC). In such devices, the mobile equipment may be used both as a transponder reader, for example, as a contactless chip card reader and, conversely, as an actual transponder for a near field communication with a terminal, for example, another mobile device, an access terminal, etc.

A recurring issue in the use of electromagnetic transponders is, for the quality of the communication, the distance separating the transponder from the reader. In particular, a natural reflex of the bearer of the transponder (for example, of the contactless chip card) is to press the card against the reader surface. This pressure may even be strong enough to fold the card. This results in mechanical stress on the chip card, which is capable of damaging the antenna generally formed of a conductive winding embedded in the card, or of damaging the contacts between the antenna and the chip.

Further, the positioning of the transponder is often not optimal for the system operation.

SUMMARY

It would be desirable to have means enabling to avoid that a user submits a transponder to unnecessary mechanical stress.

It would further be desirable to optimize the communication between a transponder (be it a chip card or a mobile device equipped with an NFC router operating as a transponder) and a terminal.

An embodiment provides a method for assisting the positioning of an electromagnetic transponder by a user with respect to a terminal, wherein:

a current value of a ratio of the current coupling factor between the transponder and the terminal to an optimum coupling factor with a first resistive load value is calculated and stored;

said current value is compared with a preceding value of this ratio, stored in a previous iteration; and data elements intended for the user are controlled according to said comparison.

According to an embodiment, the values of said ratio are obtained after the measurements:

of a first value of a D.C. voltage provided by a rectifier across an oscillating circuit of the transponder for a first value of the resistive load of this oscillating circuit; and of a second value of said voltage for a second resistive load value.

According to an embodiment, said current value is further compared with two thresholds.

According to an embodiment, the thresholds are selected according to operating parameters around the optimum coupling position in which the communication between the transponder and the terminal is considered to be optimal.

According to an embodiment, when said current value is between the two thresholds, the terminal notifies the user to no longer modify the distance to the terminal.

According to an embodiment, said current value is successively compared with the two thresholds to define whether the user should increase or decrease the distance between the terminal and the transponder.

An embodiment provides an electromagnetic transponder comprising means capable of implementing the above method.

An embodiment provides a cell phone comprising a transponder.

The foregoing and other objects, features, and advantages will be discussed in detail in the following non-limiting description of specific embodiments in connection with the accompanying drawings.

DETAILED DESCRIPTION

Figure 1:
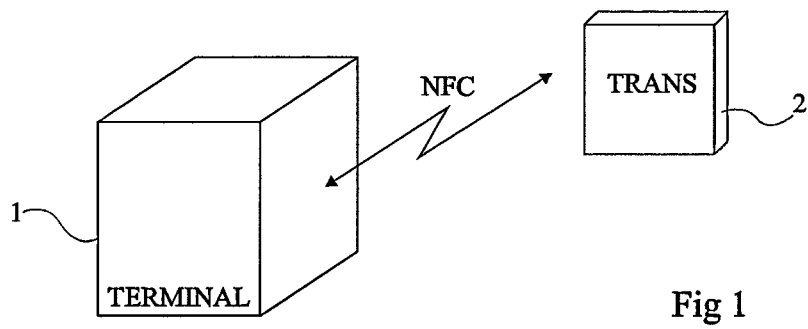
FIG. 1 very schematically shows an example of a near-field communication system.

The same elements have been designated with the same reference numerals in the different drawings. For clarity, only those steps and elements which are useful to the understanding of the described embodiments have been shown and will be detailed. In particular, the origin and the destination of the data transmitted in communications between a transponder and a terminal have not been detailed, the described embodiments being compatible with any usual communication.

FIG. 1 is a block diagram of an electromagnetic transponder communication system. A terminal 1 (TERMINAL) is capable of communicating in near field (for example according to a near field communication protocol, NFC) with a distant element, that is, a transponder 2 (TRANS).

The terminal may take different forms, for example, a transport ticket validation terminal, an electronic passport reader, a laptop computer, a mobile communication device (GSM phone, PDA, etc.), an electronic control unit for starting an automobile vehicle, etc.

The transponder may also take different forms, for example, a chip card, an electronic transport ticket, an electronic passport, a telecommunication terminal (cell phone or smartphone, PDA, etc.), an electronic tag, etc.

Figure 2:
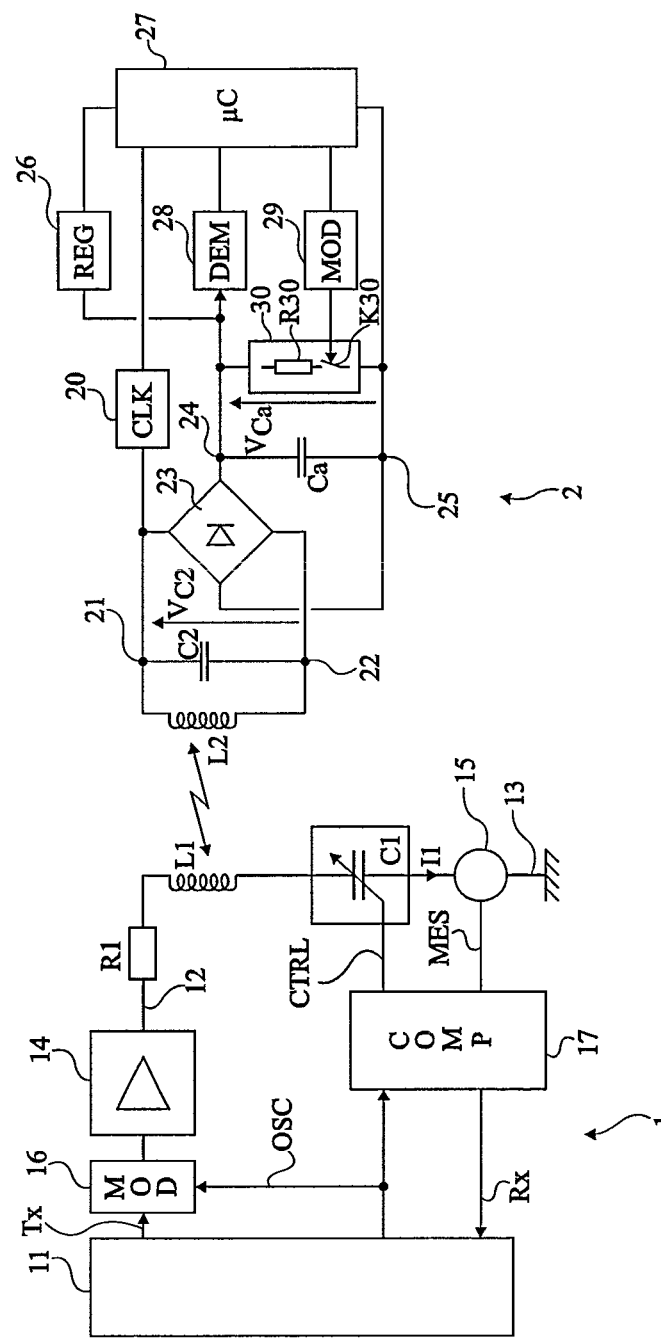
FIG. 2 is a simplified block diagram of a terminal and of a transponder of near-field communication system.

FIG. 2 very schematically shows a simplified example of a terminal 1 and of a transponder 2.

Terminal 1 comprises an oscillating circuit, generally in series, formed of an inductance L1 in series with a capacitor C1 and a resistor R1. This series oscillating circuit is, in the example of FIG. 2, connected between an output terminal 12 of an amplifier or antenna coupler 14 and a terminal 13 at a reference voltage (generally the ground). An element 15 for measuring the current in the oscillating circuit is interposed, for example, between capacitive element C1 and ground 13. Measurement element 15 belongs to a phase regulation loop which will be described hereafter. Amplifier 14 receives a high-frequency transmission signal originating from a modulator 16 (MOD) which receives a reference frequency (signal OSC), for example, from a quartz oscillator (not shown). Modulator 16 receives, if need be, a signal Tx originating from a circuit 11 for controlling and exploiting the transmissions. Circuit 11 is generally provided with a control and data processing microprocessor, communicating with different input/output circuits (keyboard, display, element of exchange with a server, etc.) and/or processing circuits, which have not been detailed. The elements of terminal 1 most often draw the power necessary to their operation from a supply circuit (not shown) connected, for example, to the power line distribution system or to a battery (for example, that of an automobile vehicle or of a portable telephone or computer). Modulator 16 provides a high-frequency carrier (for example, at 13.56 MHz) to oscillating circuit L1-C1, which generates a magnetic field.

Capacitive element C1 is, for example, a variable-capacitance element controllable by a signal CTRL. This element takes part in the phase regulation of current I1 in antenna L1 with respect to a reference signal. This regulation is a regulation of the high-frequency signal, that is, of the carrier signal corresponding to the signal provided to amplifier 14 in the absence of data Tx to be transmitted. The regulation is performed by varying capacitance C1 of the oscillating circuit of the terminal to maintain the current in antenna L1 in constant phase relationship with the reference signal. This reference signal, for example, corresponds to signal OSC provided to modulator 16. Signal CTRL originates from a circuit 17 (COMP) having the function of detecting the phase interval with respect to the reference signal and of accordingly modifying the capacitance of element C1. The comparator receives data MES relative to current I1 in the oscillating circuit, detected by measurement element 15 (for example, an intensity transformer or a resistor).

A transponder 2, capable of cooperating with terminal 1, comprises an oscillating circuit, for example, parallel, formed of an inductance L2 in parallel with a capacitor C2 between two terminals 21 and 22. The parallel oscillating circuit (called receive mode resonant circuit) is intended to capture a magnetic field generated by oscillating circuit L1-C1 of terminal 1. Circuits L2-C2 and L1-C1 are tuned to a same resonance frequency (for example, 13.56 MHz). Terminals 21 and 22 are connected to two A.C. input terminals of a rectifying bridge 23 (most often, fullwave). The rectified output terminals of bridge 23 respectively define a positive terminal 24 and a reference terminal 25. A capacitor Ca is connected between terminals 24 and 25 to smooth the rectified voltage. The recovered power is used to recharge a battery, not shown.

When transponder 2 is in the field of terminal 1, a high-frequency voltage is generated across resonant circuit L2-C2. This voltage, rectified by bridge 23 and smoothed by capacitor Ca, provides a supply voltage to electronic circuits of the transponder via a voltage regulator 26 (REG). Such circuits generally comprise a processing unit 27 (for example, a microcontroller μC) associated with a memory (not shown), a demodulator 28 (DEM) of the signals that may have been received from terminal 1, and a modulator 29 (MOD) for transmitting data to the terminal. The transponder is generally synchronized by means of a clock (CLK) extracted, by a block 20, from the high-frequency signal recovered, before rectification, from one of terminals 21 and 22. Most often, all the electronic circuits of transponder 2 are integrated in a same chip.

To transmit data from terminal 1 to transponder 2, circuit 16 modulates (generally in amplitude) the carrier (signal OSC) according to signal Tx. On the transponder side, these data are demodulated by demodulator 28 based on voltage $V_{Ca}$ across capacitor Ca. The demodulator may sample the signal to be demodulated upstream of the rectifying bridge.

To transmit data from transponder 2 to terminal 1, modulator 29 controls a stage 30 of modulation (retromodulation) of the load formed by the transponder circuits on the magnetic field generated by the terminal. This stage is generally formed of an electronic switch K30 (for example, a transistor) and of a resistor R30 (or a capacitor), in series between terminals 24 and 25. Switch K30 is controlled at a so-called sub-carrier frequency (for example, 847.5 kHz), much lower (generally with a ratio of at least 10) than the frequency of the excitation signal of the oscillating circuit of terminal 1. When switch K30 is on, the oscillating circuit of the transponder is submitted to an additional damping with respect to the load formed by circuits 20, 26, 27, 28, and 29 so that the transponder samples a greater amount of power from the high-frequency magnetic field. On the side of terminal 1, amplifier 14 maintains the amplitude of the high-frequency excitation signal at a constant level. Accordingly, the power variation of the transponder translates as an amplitude and phase variation of the current in antenna L1. This variation is detected by an amplitude or phase demodulator of the terminal. In the embodiment illustrated in FIG. 2, comparator 17 integrates a phase demodulator also used to demodulate the signal originating from the transponder. Accordingly, comparator 17 provides a signal Rx giving back to circuit 11 a possible retromodulation of data received from a transponder. Other demodulation circuits may be provided, for example, a circuit exploiting a measurement of the voltage across capacitor C1.

Many variations exist to encode/decode and modulate/demodulate communications between a transponder and a terminal.

The response time of the phase regulation loop is selected to be sufficiently long to avoid disturbing the possible retromodulation from a transponder and sufficiently short as compared with the speed at which a transponder passes in the field of the terminal. One can speak of a static regulation with respect to the modulation frequencies (for example, a 13.56-MHz frequency of the remote supply carrier and a 847.5-kHz retromodulation frequency) used to transmit data from the transponder to the terminal.

An example of phase regulation terminal is described in document EP-A-0857981. The fact that the phase is regulated on the terminal side enables to exploit current and voltage measurements in the oscillating circuit of the transponder to deduce therefrom information relative to the coupling of the transponder when it is in the field of a terminal.

Such information takes into account, in particular, the coupling between the transponder and the terminal, that is, the coefficient of the coupling between the oscillating circuit of the terminal and that of the transponder. This coupling coefficient essentially depends on the distance separating the transponder from the terminal. The coupling coefficient, designated as k, between the oscillating circuits of a transponder and of a terminal, always ranges between 0 and 1. The position where the transponder is placed against the terminal is considered as the maximum coupling position. Indeed, the antennas of the transponder and of the terminal cannot be brought closer to each other, unless the terminal package is eliminated.

In the embodiments which will be described, different relations between the electric quantities measurable by the transponder in different configurations of operation with a terminal are used to assist the user in positioning the transponder with respect to the terminal.

It is now known that an optimum coupling position $k_{opt}$, corresponding to the position at which voltage $V_{C2}$ recovered across the transponder (more specifically across its antenna) is maximum, exists between the terminal and the transponder. This optimum coupling position does not necessarily correspond to the maximum coupling position.

Figure 3:
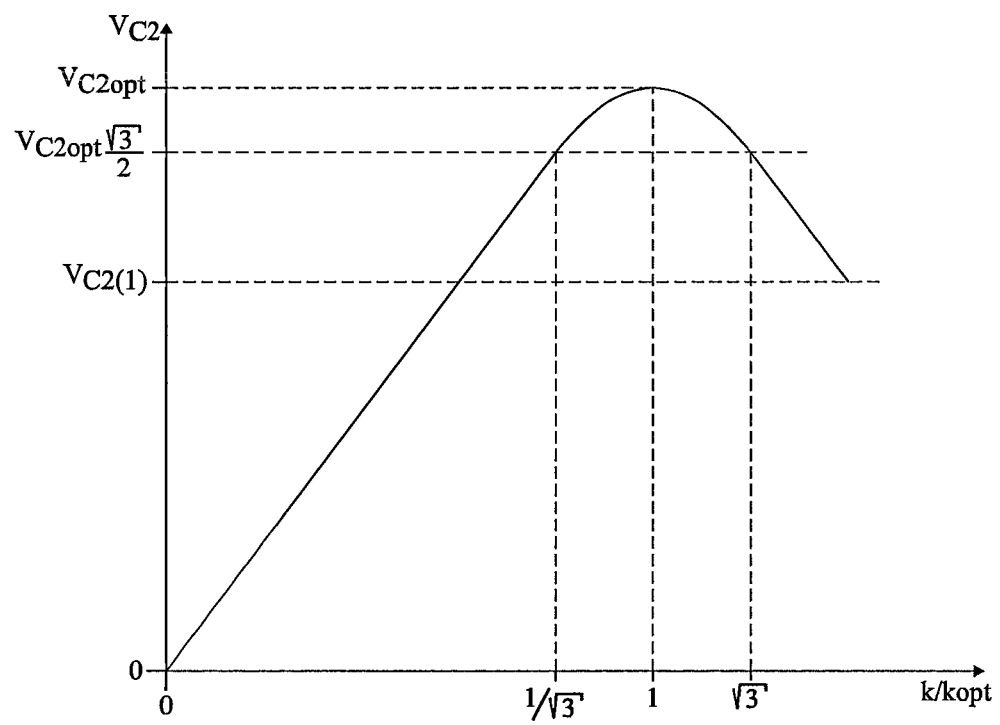
FIG. 3 illustrates an example of the variation of the voltage across the resonant circuit of the transponder according to a normalized coupling.

FIG. 3 shows an example of the shape of voltage $V_{C2}$ recovered on the transponder side according to normalized coupling $k/k_{opt}$.

The curve starts from the origin of ordinates (zero voltage) for a zero coupling. This corresponds to a distance from the transponder to the terminal such that no signal can be sensed by the transponder. Voltage $V_{C2}$ reaches a maximum $V_{C2opt}$ for an optimum coupling coefficient $k_{opt}$ ($k/k_{opt}=1$), and then decreases to an intermediate value $V_{C2(1)}$ reached at coupling 1. The maximum coupling position is at a given location of this curve, but not necessarily at the optimum coupling position. This in particular depends on the different values of the capacitive and resistive elements.

Other remarkable points of the curve of FIG. 3 are points of inflexion where ratio $k/k_{opt}$ is respectively equal to $1/\sqrt{3}$ and to $\sqrt{3}$, and where voltage $V_{C2}$ has the same value $$\left(V_{C2opt} \cdot \frac{\sqrt{3}}{2}\right)$$

on the transponder side.

Relations expressing the value of voltage $V_{C2}$ according to the ratio of the current coupling to the optimum coupling and linking the value of the equivalent resistor to the load formed by the transponder elements on its own oscillating circuit have become usual. This equivalent resistor is generally called R2. Resistor R2 represents the equivalent resistor of all the circuits (microprocessor, retromodulation means, etc.) of transponder 2, placed in parallel on capacitor C2 and inductance L2 (before or after the rectifying bridge). The conductance due to the transponder circuits, and thus their power consumption, is also called "resistive load". The level of this load is symbolized by resistor R2 across the oscillating circuit.

Relations linking these relative values to the coupling and to different values taken by resistance R2 are provided, for example, in document EP-A-2276643 (B9617-09-RO-119).

It is provided to exploit these relations to assist the user holding the transponder in placing it at an optimal distance from the terminal or reader to optimize the communication.

For a given coupling value k, considering that the impedance of the oscillating circuit of the terminal does not vary and that the circuits remain tuned, the ratio of current coefficients k to optimum coefficients $k_{opt]R20}$ and $k_{opt]R21}$, respectively for a resistor R2 of value R20 and of value R21, may be expressed (for example, by exploiting the relations indicated in the above-mentioned document), as:

$$\frac{\frac{k}{k_{opt]R20}}}{\frac{k}{k_{opt]R21}}} = \sqrt{\frac{R20}{R21}}. \quad \text{(formula 1)}$$

Still in the same conditions, the square of the ratio, noted r, of current coefficient k to optimum coefficient $k_{opt]R20}$, according to voltages $V_{C2]R20}$ and $V_{C2]R21}$ of voltage $V_{C2}$, respectively for values R20 and R21 of resistor R2, may be written as:

$$r^2 = \left(\frac{k}{k_{opt]R20}}\right)^2 = \frac{\frac{V_{C2]R21}}{V_{C2]R20}} \cdot \frac{R20}{R21} - 1}{1 - \frac{V_{C2]R21}}{V_{C2]R20}}} \quad \text{(formula 2)}$$

When the coupling is optimum with resistor R21 ($k=k_{opt]R21}$), the following may also be written:

$$r^2 = \left(\frac{k}{k_{opt]R20}}\right)^2 = \frac{R20}{R21} \quad \text{(formula 3)}$$

These relations enable, by varying the value of resistance R2, to indicate to the bearer of the transponder an optimal distance with respect to the terminal or reader.

Figure 4A:
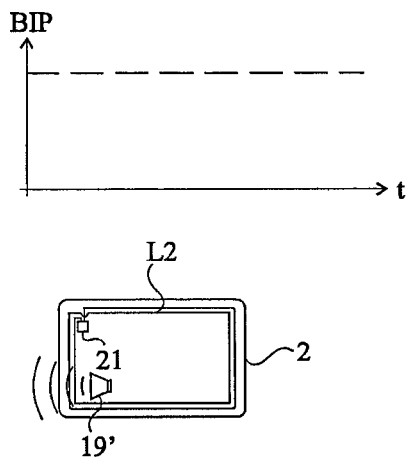
FIGS. 4A, 4B, and 4C illustrate an embodiment of the method for assisting the communication between a transponder and a reader.
Figure 4A:
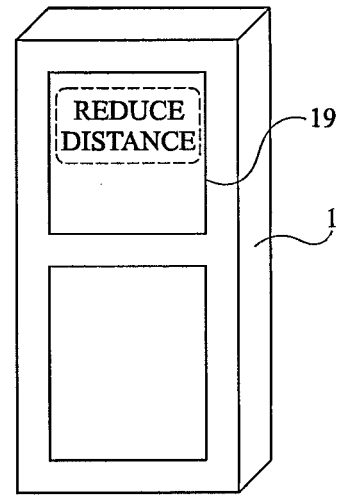
Figure 4B:
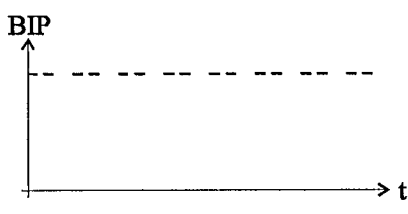
Figure 4B:
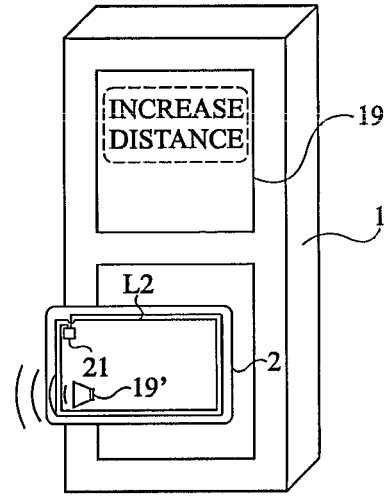
Figure 4C:
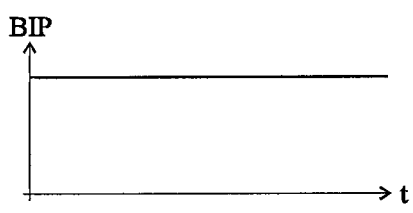
Figure 4C:
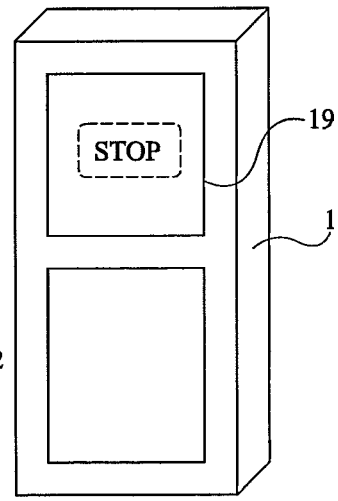

FIGS. 4A, 4B, and 4C illustrate, in simplified representations of relative positions of a terminal 1 and of a transponder 2, an embodiment of the positioning assistance method for optimizing communications.

Terminal 1 is assumed to be a mobile telecommunication device of cell phone type and transponder 2 is assumed to be a chip card. All that will be described however also applies to the case where the transponder is a telecommunication terminal equipped with an NFC router and where terminal 1 is another mobile device operating in reader mode or is a fixed terminal, etc. It should be noted that, when it is spoken of bringing the transponder closer to or further away from the terminal, this may correspond to moving a terminal away from or closer to the transponder, for example, in the case of a fixed transponder (transponder integrated to posters or the like).

According to this embodiment, the information relative to current coupling k with respect to the optimum coupling with two values R20 and R21 of resistor R2 is exploited to determine whether the transponder needs to be brought closer to or further away from the terminal.

The example of FIG. 4A corresponds to a position in which transponder 2 must be brought closer to terminal 1. Transponder 2 is equipped, for example, with a loudspeaker 19' which then emits a sound signal (BIP). A first sound signal frequency or a first sound pulse train is for example provided.

The implementation of the described embodiments requires for the transponder (the system element behaving as a transponder) to be equipped with visual or sound warning means. For example, if the phone-type mobile device playing the role of terminal 1 in FIGS. 4A to 4C starts behaving as a transponder, its display 19 may be used to display a message (REDUCE DISTANCE) as illustrated by the dotted lines of FIG. 4A.

FIG. 4B illustrates the case where the transponder should be moved away from the terminal (for example, the case where it would be laid on the terminal and where the optimum coupling position would not correspond to this maximum coupling). In this case, loudspeaker 19' of the transponder emits a sound signal at another frequency or a train of sound pulses (BIPS) at another frequency than in the case of FIG. 4A. In the variation illustrated in dotted lines where the cell phone would be the transponder, its display 19 displays a message different from that of FIG. 4A (for example, a message requiring a distance increase) (INCREASE DISTANCE).

FIG. 4C illustrates the case where the transponder is in a position of optimum coupling with respect to terminal 1. In this case, loudspeaker 19' emits a still different sound signal (for example, a continuous sound signal or a signal at a different frequency than in the two previous cases). In the variation illustrated in dotted lines where the phone behaves as a transponder, its display 19 notifies the user (for example, by a STOP-type message) that the optimal position has been reached and that he should no longer move.

Figure 5:
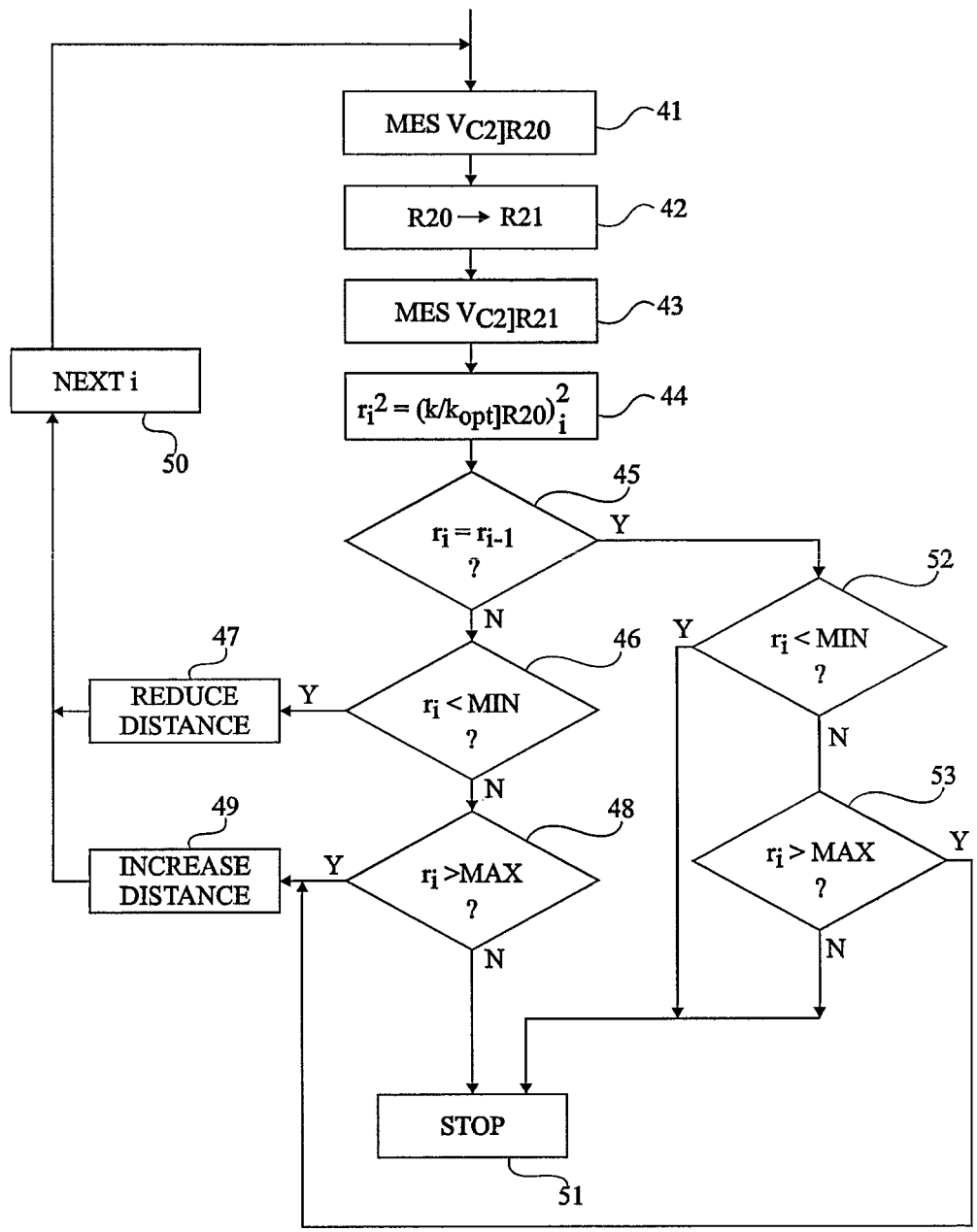
FIG. 5 is a block diagram illustrating an implementation mode of the communication assistance method.

FIG. 5 is a flowchart illustrating an implementation mode of the transponder positioning assistance method.

To simplify the discussion of FIG. 5, it is still referred to values $V_{C2]R20}$ and $V_{C2]R21}$, knowing that it is in practice easier to measure values $V_{Ca]R20}$ and $V_{Ca]R21}$ of voltage $V_{Ca}$ but that this changes nothing to the comparison thresholds of the ratio of the coupling to the optimum coupling at a given value of the resistance.

It is started (block 41, MES $V_{C2]R20}$) by measuring and storing the voltage across capacitor C2 with a first value R20 of capacitance R2.

Then (block 42, R20->R21), the value of resistive element R2 is switched to a lower value R21. As a variation, the value of resistance R2 is modified towards a lower value R2.

Then (block 43, MES $V_{C2]R21}$), voltage $V_2$ is measured with the value of resistance R21, which is stored.

The present value of the ratio of coupling k to the optimum value with resistance R20, squared (block 44, $r_i^2 = (k/k_{opt]R20})_i^2$, is then calculated and stored. This calculation is performed, for example, according to the above formula 2.

The present ratio is then compared (block 45, $r_i = r_{i-i}$?) with ratio $r_{i-1}$ calculated at the previous iteration (i–1). This test amounts to determining whether the distance between the transponder and the terminal varies. It should be noted that the squares of the ratios can then be directly compared.

If the distance varies (output N of block 45), that is, the user moves one of the two elements with respect to the other, it is determined whether ratio $r_i$ is within an acceptable range defined by two thresholds MIN and MAX, that is, around the optimum coupling with an acceptable tolerance. To achieve this, it is for example started by determining whether ratio $r_i$ is lower than lower threshold MIN (block 46, $r_i$<MIN?). If it is (output Y of block 46), this means that the two elements have to be brought closer to each other (block 47, REDUCE DISTANCE). If it is not (output N of block 46), current value $r_i$ is compared with the maximum threshold (block 48, $r_i$>MAX?). If maximum threshold MAX is exceeded (output Y of block 48), this means that the transponder should be moved away from the terminal (block 49, INCREASE DISTANCE) since the optimum coupling point has been passed.

In both cases, a subsequent measurement is performed (it is proceeded to a next iteration) to verify whether the user has effectively taken the instruction into account (block 50, $NEXT_i$).

If the transponder is within the acceptable distance range (output N of block 48), it is displayed or indicated to the user that this position is correct and the he does not need to move any more (block 51, STOP).

If the transponder no longer moves with respect to the terminal (output Y of block 45), its position with respect to the optimum coupling is examined. For example, it is started by checking whether it is too distant (block 52, $r_i$<MIN?). If it is (output Y of block 52), this means that, although the transponder has been pressed against the terminal, the optimum coupling position cannot be reached by bringing the transponder closer, generally because of the terminal package. The user is then requested to stop (block 51).

If the motionless position corresponds to a position greater than the minimum (output N of block 52), it is checked (block 53, $r_i$>MAX?) whether ratio $r_i$ is greater than the maximum value. If it is (output Y of block 53), the user is notified that he should move the transponder away from the terminal (block 49). If it is not, he is told to no longer move (block 51) since the present position then is within the acceptable range.

As a variation, tests 52 and 53 are omitted and it is directly proceeded to block 51 at the affirmative output (Y) of test 45.

The selection of thresholds MIN and MAX depends on the application and is also performed to provide a hysteresis, which avoids that the notification system permanently varies. Indeed, it could have been devised to directly compare the threshold with the optimum coupling. However, this would in practice result, due to the fact that the object is held by a user and thus sensitive to the displacement of his hand, in an unstable system.

The thresholds may be, for example, generated by resistive dividing bridges or are pre-calculated and stored in a non-volatile memory of the transponder for a numerical comparison.

Figure 6:
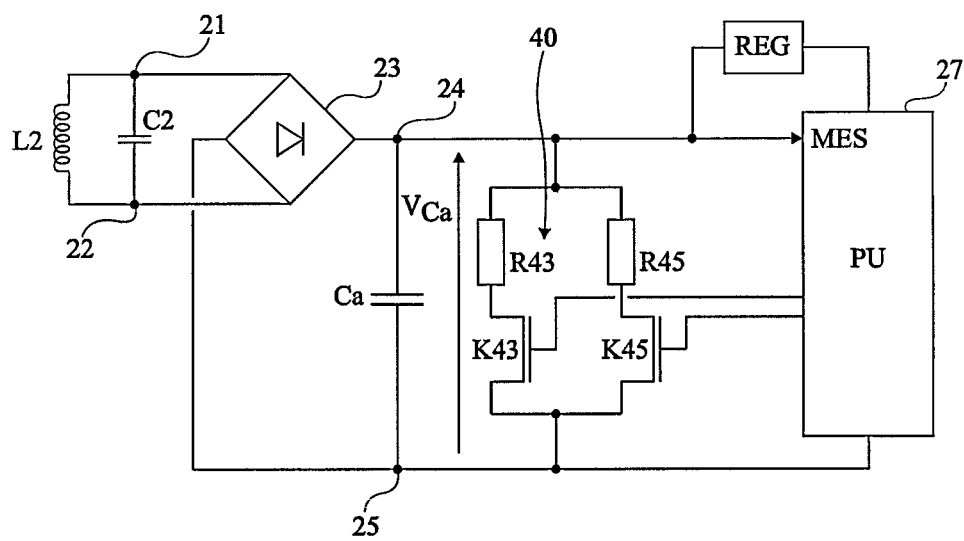
FIG. 6 is a block diagram of an embodiment of a transponder adapted to assessing its coupling factor with a terminal.

FIG. 6 is a block diagram of an embodiment of a transponder 2, equipped to automatically determine, when said transponder is in the field of a terminal (not shown), the ratio of the current coupling to the optimum coupling. The representation of FIG. 6 is simplified with respect to that of FIG. 2. In particular, the elements of demodulation, retromodulation, and for obtaining the clock frequency have not been illustrated.

FIG. 6 illustrates the presence of a switchable resistive circuit 40 between terminals 24 and 25 of rectifying bridge 3. For example, two resistors R43 and R45 are connected in parallel, each being in series with a switch K43, respectively K45. Switches K43 and K45 (for example, MOS transistors) are intended to be switched as will be seen hereafter in relation with FIG. 6 to implement the method for assisting the positioning of the transponder. Processing unit 27 receives information relative to voltage $V_{Ca}$ on an input MES to implement this method. In the example of FIG. 6, when both resistors R43 and R45 are functionally connected, resistor R2 (load of the transponder circuits) has value R20. The disconnection of one of the resistors (for example, resistor R43) increases the value of resistance R2 towards value R21. Other connections and switchings may be provided. For example, a single switchable resistor may be used, considering that one of the two values of resistance R2 corresponds to the resistive load of the other transponder circuits.

According to an embodiment, the switchable resistor corresponds to that used for a resistive retromodulation. A first measurement is performed by switching the retromodulation resistor so that it is functionally in the circuit (switch 40) in the on state in the example of FIG. 2. Voltage $V_{C2]R20}$ is then measured. Then, switch K30 is turned off and voltage $V_{C2]R21}$ is measured as described in relation with FIG. 5. The implementation of the described method then requires no structural modification of a transponder equipped with a microcontroller. It is sufficient to program this microcontroller so that it thus switches the retromodulation resistor.

As a variation, the increase or the decrease of equivalent resistance R2 is caused by a variation of the power consumption of the transponder circuits, typically of processing unit 27. For example, to decrease the value of resistance R2 (to increase the power consumption), the execution of calculations or processing by unit 27 is triggered. Equivalent resistance R2 may also be increased by decreasing the consumption of unit 27 by interrupting certain calculations.

Various embodiments have been described, and many alterations, modifications, and improvements will occur to those skilled in the art. In particular, the selection of the thresholds acceptable for ratio $r_i$ and of the periodicity of the measurements and iterations is within the abilities of those skilled in the art according to the application. Further, the inequality relations may correspond to strict or non-strict inequalities. Further, other notification means than sound or visual indicators may be used. For example, a system causing a vibration of the transponder in the case where it is a mobile telecommunication device equipped with an NFC router and stopping the vibration when the reached position is correct or, conversely, causing a vibration thereof once this reached position is correct, may be provided.

Further, the practical implementation of embodiments is within the abilities of those skilled in the art based on the functional indications given hereabove and by using hardware and software tools currently present in transponder systems. It should be noted that the implementation of these embodiments requires no modification of the terminal and is only performed on the transponder side.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method to assist a user positioning an electromagnetic transponder with respect to a terminal, comprising:
   calculating by the terminal a first ratio relating a first coupling factor between the electromagnetic transponder and the terminal to a selected optimum coupling factor, the selected optimum coupling factor based on a first resistive load value;
   storing the calculated first ratio;
   controlling a variable capacitance circuit of the terminal with control information generated by a phase interval detection circuit, the phase interval detection circuit arranged to receive data representative of current flowing through a measurement element of the terminal, the current flowing through the measurement element of the terminal corresponding to a current coupling factor between the electromagnetic transponder and the terminal;
   calculating by the terminal a current ratio relating the current coupling factor between the electromagnetic transponder and the terminal to the selected optimum coupling factor;
   comparing by the terminal said current ratio with said first ratio; and
   controlling at least one output data element according to said comparison.

2. The method of claim 1, comprising:
   measuring a first value of direct current voltage provided by a rectifier across an oscillating circuit of the electromagnetic transponder for the first resistive load value of the oscillating circuit; and
   measuring a second value of direct current voltage for a second resistive load value.

3. The method of claim 1, comprising:
   comparing the current ratio with at least two threshold values.

4. The method of claim 3, wherein the at least two threshold values are selected according to operating parameters of the terminal during communication between the electromagnetic transponder and the terminal.

5. The method of claim 3, wherein when said current ratio is between two of the at least two threshold values, the at least one output data element notifies the user to no longer reposition the electromagnetic transponder with respect to the terminal (1).

6. The method of claim 2, comprising:
   successively comparing the current ratio with two of the at least two threshold values; and
   directing the user to increase or decrease a distance between the terminal and the electromagnetic transponder based on the successive comparing.

7. The method of claim 1 wherein the electromagnetic transponder is formed in a telecommunication terminal.

8. The method of claim 1 wherein the electromagnetic transponder is formed in a chip card.

9. A terminal arranged for communication with an electromagnetic transponder, comprising:
   a control circuit;
   an antenna circuit;
   a modulator to encode data in a high frequency signal under direction of the control circuit, the data communicated via the antenna for reception by the electromagnetic transponder; and
   a phase regulation feedback circuit arranged to provide measurement information representative of a coupling factor between the terminal and the electromagnetic transponder, the phase regulation feedback circuit including:
      a variable capacitance circuit series coupled to the antenna;
      a measurement element series coupled to the variable capacitance; and
      a phase interval detection circuit arranged to receive data representative of current flowing through the measurement element, the phase interval detection circuit arranged to provide control information to the variable capacitance;
   wherein the terminal is arranged to:
      iteratively calculate a ratio relating the coupling factor to a reference coupling factor, the reference coupling factor based on a reference load value;
      store each calculated ratio;
      compare a current ratio with an earlier calculated ratio; and
      control an output data element according to said comparison.

10. The terminal of claim 9, wherein the measurement element includes at least one of a transformer and a resistor.

11. The terminal of claim 9, wherein the terminal is further arranged to:
    compare a current value of the ratio with at least two threshold values.

12. The terminal of claim 11, wherein the at least two threshold values are selected according to operating parameters of the terminal during communication between the electromagnetic transponder and the terminal.

13. The terminal of claim 9, comprising:
an output element arranged to provide a notification based on at least one calculated ratio relative to at least one threshold value, the notification arranged to direct closer placement of the electromagnetic transponder to the terminal, further placement of the electromagnetic transponder to the terminal, or satisfactory placement of the electromagnetic transponder to the terminal.

14. The terminal of claim 13 wherein the output element is arranged to communicate the notification to the electromagnetic transponder.

15. The terminal of claim 9 wherein the terminal is formed in a mobile communication device.

16. A phase regulation feedback circuit arranged to provide measurement information representative of a coupling factor between a terminal and an electromagnetic transponder, comprising:
a variable capacitance element coupleable to a control circuit and an antenna circuit;
a measurement element series coupled to the variable capacitance element; and
a phase interval detection circuit arranged to receive data representative of current flowing through the measurement element, the current flowing through the element representative of the coupling factor, the phase interval detection circuit further arranged to direct control information to the variable capacitance element based on a calculated ratio relating the coupling factor to a reference coupling factor.

17. The phase regulation feedback circuit of claim 16, comprising:
an output arranged to provide data representative of the calculated ratio to the control circuit, the data arranged to direct closer placement of the electromagnetic transponder to the terminal, further placement of the electromagnetic transponder to the terminal, or satisfactory placement of the electromagnetic transponder to the terminal.

18. The phase regulation feedback circuit of claim 16, wherein the measurement element includes a transformer.

19. The phase regulation feedback circuit of claim 16 wherein the phase regulation feedback circuit is formed in a mobile communication device.

* * * * *